INVENTOR:
WALTER LESLIE HUNT
BY Bau, Borden & Fox
ATTORNEYS.

Patented Oct. 16, 1945

2,386,799

UNITED STATES PATENT OFFICE 2,386,799

CONTROLLING SYSTEM FOR REGULATORS

Walter Leslie Hunt, Philadelphia, Pa., assignor to Automatic Temperature Control Co., Inc., Philadelphia, Pa., a corporation of Pennsylvania Application April 25, 1942, Serial No. 440,530

37 Claims. (Cl. 236—78)

This application is a continuation in part of application Ser. No. 387,427, filed April 8, 1941, of which the following is a specification.

This invention relates to controlling systems for regulators. It pertains particularly to regulators for valves, dampers, rheostats, in-put controllers, etc., which it is necessary to adjust in one way or the other in order to control and substantially to maintain certain desired conditions, whether of temperature, pressure, humidity, speed or any other conditions, at substantially a constant value despite fluctuations of variables tending both to change the value of the particular condition and to change the relation of the regulator adjustment of the value of the particular condition.

It will be evident that the invention is of wide scope and is susceptible to use in many diversified and varied fields. For the sake of simplicity the four types of control mentioned above may be taken to be representative and typical examples. Purely for purposes of illustration the invention will be described in all essentials as being concerned with the control of a regulator for a fuel supply line in order to maintain constant temperature conditions in a furnace or the like.

In its essence, the balancer relay system used in the instant invention comprises preferably a number of cooperating parts of which a brief résumé may be given to advantage at this point. A Wheatstone bridge circuit is provided in which opposite legs comprise, respectively, the slidewire and arm in the pyrometer, responsive to the condition to be controlled (temperature), and the slidewire and arm which is coupled to the device for securing a change in the fuel supply (valve). The arms of the respective slidewires and their circuits are electrically the substantial equivalents of the galvanometer or the like of the conventional bridge circuit. The slidewires have their respective ends coupled in the Wheatstone bridge circuit by means of a pair of adjustable rheostats or variable resistances, or potentiometers, which are designated as "automatic load compensators," as, by the shifting of the rheostats, the initially symmetrical balance of the valve responsive slidewire arm and the valve coupled slidewire arm will assume a new position in the Wheatstone bridge circuits (as the valve position changes) of asymmetrical balance for the same position of the pyrometer controlled slidewire arm relative to its slidewire. The load compensation shifting from a neutral balanced central setting is accomplished automatically in either direction by a reversible motor actuated by the high and low contacts of the pyrometer disposed within a few degrees of the control point driven through an adjustable interrupter. A "throttling range adjustment" is preferably provided in the form of supplemental coupled rheostats or potentiometers operative to variably effectively lengthen the side arms of the circuit between the slidewires to modify and selectively to predetermine the effective slidewire throttling range. An "automatic resetting" action is provided in the load compensator, effective upon actuation of a limit switch controlled either by the movement of the fuel valve or by the movement of the pyrometer controlled slidewire arm relative to the throttling range thereof, to nullify, temporarily, the load compensation, so as to reestablish temporarily the symmetrical balanced relationship of the bridge circuit.

It is among the objects of this invention to improve the art of regulation control; to provide a regulator control of great sensitivity and accuracy which automatically determines the amount of fuel in-put for an immediate demand; to provide a regulator control in which the pyrometer controlled arm of a slidewire is in circuit with the valve coupled arm of a slidewire, and arranged automatically to establish selectively symmetrical or asymmetrical relationship between the arms to accord with variations in load and temperature conditions, and which is also capable of reestablishing the symmetrical relationship when the pyrometer controlled arm or the valve coupled arm reaches an extreme point; to provide in a bridge circuit control a load compensation adjustment by which the slidewire arms of a pyrometer and the valve operator are balanced despite misalignment, and further to provide automatic means for resetting the slidewire arm of the valve operator and the load compensation adjustment to establish aligned balance in response to attainment by the pyrometer arm or the valve of a predetermined maximum or minimum setting; to provide a control system of simplicity and efficiency; to provide a regulator in which any return of the pyrometer controlled arm on its slidewire to the throttling range is accompanied by symmetrically balanced valve movement return coupled thereto, to provide a coupling between the pyrometer slidewire and the valve operator such that balance of the valve and the pyrometer can be symmetrical or asymmetrical as long as the pyrometer arm is within its throttling range, and in which attainment of the limit of the throttling range actuates the valve operator to establish symmetrical balance with the pyrometer arms; to provide an improved regulator in which conditions of balance and control are either directly or indirectly a function of pyrometer arm relative movement; to provide an improved regulator which can either be built directly into a pyrometer instrument, or effectively in-built by providing an auxiliary unit for association with a separate pyrometer instrument; to provide a regulating control which can maintain the control point even with the valve fully open or fully closed; and many other objects and advantages of the invention will become more evident as the description proceeds.

In the accompanying drawings forming part of this application,

Figure 1:
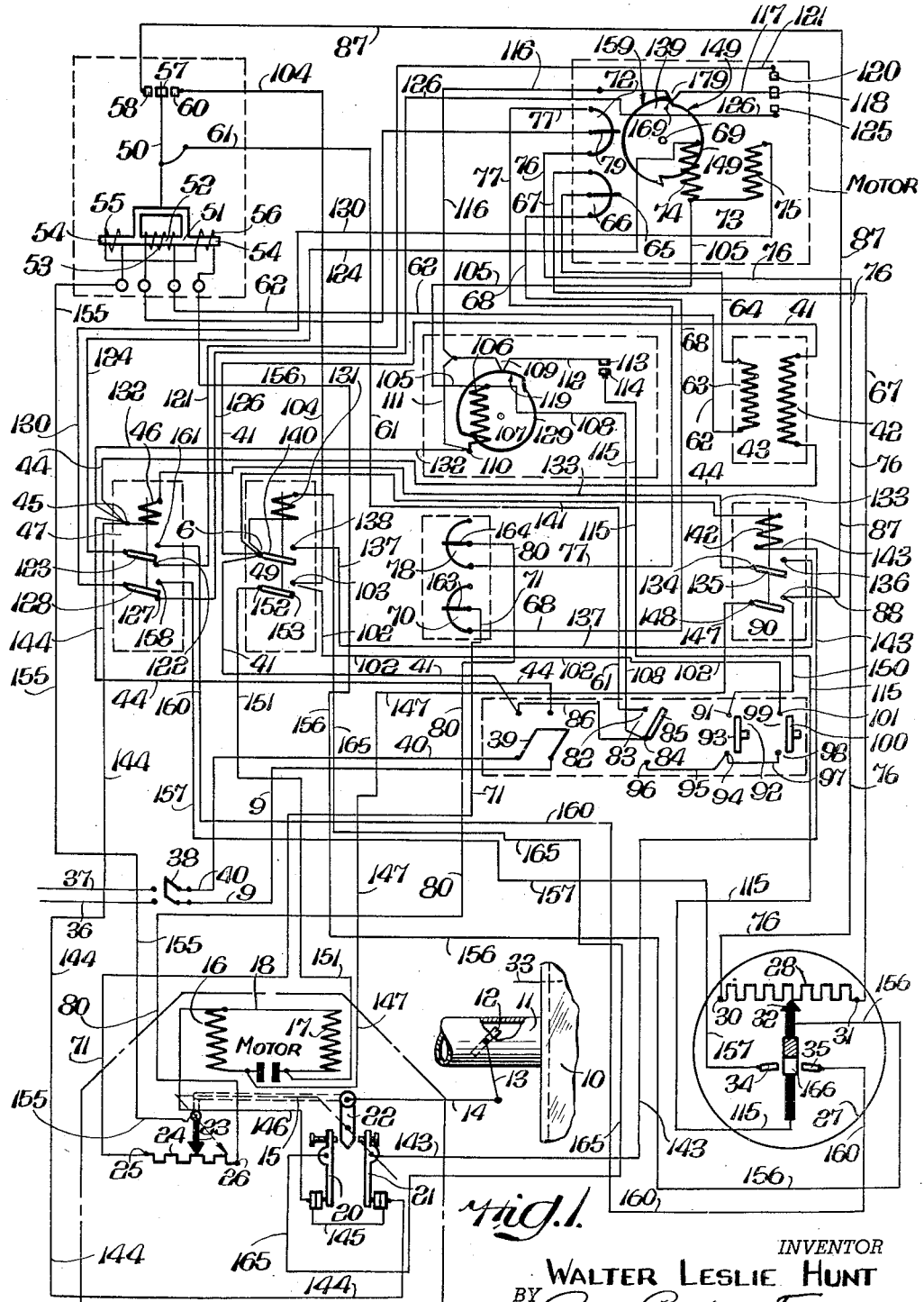
Fig. 1 represents a wiring diagram of the control system of the invention with certain of the structure schematically indicated.

Purely for purposes of illustration, as noted, it will be assumed that the control is to be operatively effective upon a valve in a fuel line running to a furnace containing a temperature responsive element such as a pyrometer. Specifically the furnace 10, shown in fragmentary form in Fig. 1, is supplied by a fuel line 11 containing the valve element 12, the position of which is determined by a lever arm 13 pivoted to link 14, which in turn is pivotally connected to a link 15, which is actuated in one direction or the other by the respective field coils 16 and 17 of the reversible motor 18. Limit switches respectively 20 and 21 are both closed during running of the motor and are respectively actuated at the alternate extremities of the motions of the link 15, through a pivoted switch-actuating member 22, effective with both switches 20 and 21 as is common in this type of device, so that the limit switches open either at or toward the maximum or minimum valve positioning. As the position of valve element 12 in fuel line 11 is a function of the adjusted position of the link 15, so this functional relation is indicated by the position of the movable wiping element or slidewire arm 23 relatively to the slidewire 24, disposed between terminals 25 and 26, in the circuit to be described.

A pyrometer responsive instrument 27 is provided containing a slidewire 28 between terminals 30 and 31, of the circuit to be described, and with reference to which a contact making pointer, needle or slidewire arm 32 having an insulated secondary contact-making portion 166 has wiping adjustment in response to variations in the temperature of the furnace 10, through an electrical connection (not shown) with the pyrometer 33. It will be understood that the arm, pointer or indicator 32, in its swinging movements relative to the slidewire has a neutral median no-contact position from which it has a relatively restricted variable swinging movement between engagement of contact making portion 166 either with a low temperature adjustable contact 34 or a high temperature adjustable contact 35, in the circuit to be described as well as a potentiometer functioning in engagement of arm 32 and slidewire 28, as will be understood. Practically any movement of appreciable extent from the median position of the pointer 32, finds a contact being closed between contact portion 166 of pointer 32, and either low contact 34 or high contact 35.

The controlling instrument comprising the invention is preferably actuated through the leads 36 and 37 of an A. C. power line controlled by a master double-pole switch 38. One side of the line 40 from switch 38 extends through a second double-pole switch 39 and through a connector 41, which touches the terminal 6 common to one pole and to the actuating coil 131 of a double pole relay 49 (normally held "in" by the closing of limit switch 21 as will be explained), through primary coil 42 of a transformer 43, and through a connector 44 to and beyond one pole 45 of the actuating coil 46 of a double-throw relay 47 (normally held "in" by the closing of limit switches 20 and 21 as will be explained), through switch 39, through connector 9 to the other side of the line switch, to the return line 36.

Figure 2:
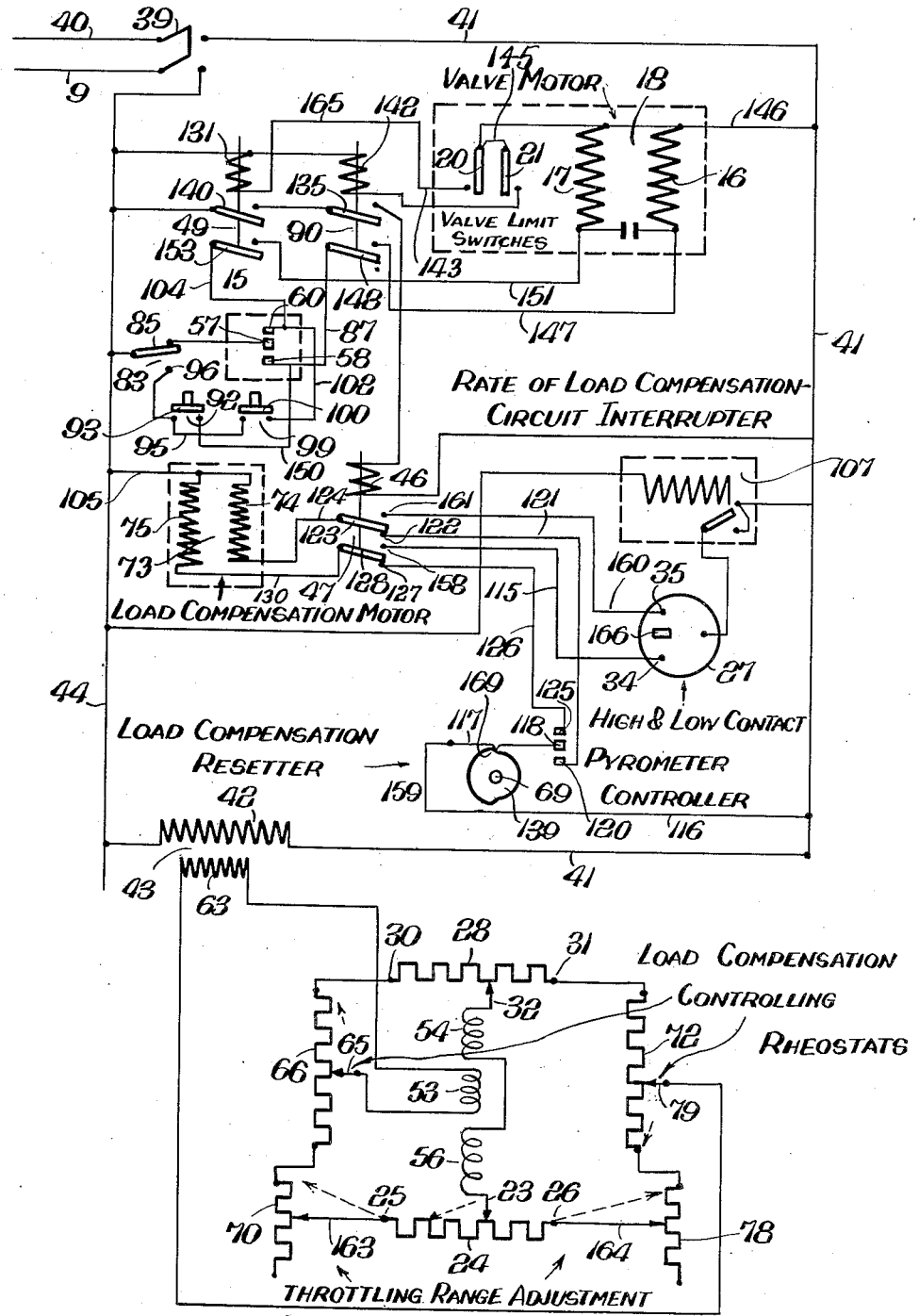
Fig. 2 represents a schematic wiring diagram showing the operation of the circuit to secure the control desired.

The "balancer" control bridge relay of the instrument, operating in a Wheatstone bridge circuit, may be of any desired sort, but as shown in Figs. 1 and 2 it comprises a pivoted beam or arm 50 carrying a bar 51 having a central shank 52, permanently serving as the core of a continuously energized stabilizing and polarizing coil 53. The ends 54 of bar 51 are in operative relation respectively to the coils 55 and 56 disposed in reversed series and being energized in one way or the other only during and as a result of conditions of unbalance in the bridge circuit. Beam 50 carries a double ended contact 57 and from a stable mid-position moves between and establishes contact alternately with either of fixed contacts 58 or 60. For this purpose beam 50 is electrically connected with a lead 61.

The stabilizing coil 53 of the bridge relay is connected at one end through a lead 62 with a secondary coil 63 of the transformer 43. The other side of said secondary is connected through lead 64 to the adjustable wiping element 65 of a potentiometer 66. The latter, through one lead 67, connects with the terminal 30 of the slidewire 28 of the actuating instrument. The other side of the potentiometer 66 connects through a lead 68 to potentiometer or rheostat 70 and through adjustable wiping element 163 through lead 71, to the terminal 25 of the slidewire 24, coupled with the valve operator.

The movable element 65 of the potentiometer 66 is mechanically coupled with a similar movable or driven arm 79 of a potentiometer 72, connected to the other end of secondary coil 63, with both driven arms on the same shaft 69, and both are driven in one direction or the other by a reversible load compensating motor 73 having fields 74 and 75 arranged for alternate energization to drive shaft 69. The potentiometer 72 connects on one side through a lead 76 to terminal 30 of the slidewire 28 of the actuating instrument, and on the other side through connector 77, to a variable resistor or rheostat 78, the movable element 164 of which is coupled for simultaneous and similar actuation with the movable element 163 of the variable resistor 70. Rheostats 70 and 78 comprise the "throttling range adjustment." The movable element 164 of variable resistor 78 is connected through lead 80 to a terminal 26 of the slidewire 24 of the valve operator (which terminal is opposite to terminal 25 to which resistor 70 is connected).

As noted movable elements 163 and 164 of variable resistors 70 and 78 are coupled on a common shaft for simultaneous actuation, as by a manually controlled knob (not shown) for varying the throttling range of the circuit.

The sensitive relay for the bridge circuit having the beam 50, may be of any desired sort which is capable of sharp definition between on and off and which is free from fluctuations in response to incidental vibrations. The preferable type of relay according to Figs. 1 and 2 is that disclosed in the patent to Macgeorge No. 2,108,775, of February 15, 1938. The beam 50 is connected with the lead 61, which in turn runs to a terminal contact 82 of a switch 83. Switch 83 has two alternate closed positions, one being for "automatic" operation when bridge piece 85 moving on terminal 84 engages contact terminal 82. The other position for "hand" operation being when bridge piece 85 leaves contact 82 and engages terminal contact 96 to be described. The "automatic" circuit closing establishes a circuit in one direction through connector 86 to and through one contact of the double-pole switch 39, through connector 41 to the terminal 6 of relay 49 previously described, through the primary coil 42 of the transformer 43, and through lead 44 past pole 45 of relay 47 to the other terminal of switch 39, and back to the line.

The contact 58, of the bridge relay, which may be designated the "low temperature" terminal or contact, is engaged with a connector 87 extending to a terminal 88 of the double-pole relay 90 (normally held "in" by limit switch 21), then to a terminal 91 of the "open" switch 92. The latter has a bridge piece 93 to connect terminal 91 with a terminal 94, and through lead 95 to the terminal 96 of switch 83 for the "hand" operation of the device when engaged by the bridge member 85. The contact 94 through a lead 97 is coupled to a terminal 98 of the "close" switch 99 and through the movable hand piece 100 electrically engages a terminal 101 when the switch is closed. From terminal 101 the circuit is led through connector 102 to a terminal 103 of the double-pole relay 49 (normally held "in" by limit switch 20), and through connector 104 to the "high contact" 60 of the bridge circuit relay.

The reversible load compensation motor 73 drives the potentiometers 66 and 72 simultaneously and synchronously in the same direction, according to the energization of the respective coils 74 and 75. The latter are connected at one end in a common return 105, extending to one end of the field winding 106 of the load compensation "interrupter" motor 107, then through lead 108 to common terminal 84 of switch 83, and through connector 86 and switch 39 to one side of the power line. The field winding 106 of interrupter motor 107 at its other end is engaged by a connector 111 running to the resilient interrupter bar 112 having a contact 113 in a position to make and break contact with a fixed contact 114. The interrupter bar 112 has a protuberant portion 109 in position to ride upon the high cam surface 119 of a variable cam 129 driven by the interrupter motor 107.

The cam is preferably split and adjustable so as to vary the time that the protuberance 109 is off of high cam surface 119, so as to energize contact 114 by contact 113. Contact 114 through connector 115 engages the circuit closing element 166 of the movable arm 32 of the slidewire 28 of the actuating instrument 27 so as to establish a circuit from 166 through contact 34 or 35, separate from the variable circuit between wiping arm 32 and slidewire 28. The interrupter bar 112 is coupled through a connector 116, with a resilient load compensation resetting contactor bar 117, having the double contact 118 arranged selectively to engage a lower contact 120 or an upper contact 125 or to be positioned between and out of contact with both. The resetting bar 117 is controlled by a cam 139 driven by shaft 69 of load compensating motor 73. The cam includes a low contact surface 149, a high contact surface 159 and a sloping surface 169 upon which a bar carried protuberance 179 may stop and rest to hold the resetting bar in the mid-position shown.

Lower contact 120 of the resetting circuit, through connector 121 leads to a pole 122 of the upper switch of the double pole relay 47. When the relay has fallen out (as is illustrated), the bridge piece 123 of the relay establishes contact with terminal contact or pole 122 and through connector 124 extends to the free end of the field winding 74 of the reversible load compensating motor 73 to close a driving circuit through that winding. Obviously this circuit through winding 74 is broken when the relay 47 is actuated by being moved "in." The upper resetting contact 125, when engaged by contact 118 on bar 117 closes the circuit therethrough and through a connector 126 to a terminal contact 127 in the lower switch in the double pole relay 47. When the bridge piece 128 of the relay 47 is in engagement with terminal 127, when the relay has dropped out, the circuit is continued through connector 130 to the free end of the field winding 75 of the reversible load compensator motor 73, to actuate the motor in the opposite direction. Obviously either the opening of the circuit between the double contact 118 and fixed contact 125 of the load compensation resetter, or the energization of the relay 47, will interrupt this circuit and stop the motor.

The interrupter motor 107, which is preferably continuously driven, has its field in a circuit through connector 132 extending from field terminal 110, to the terminal 45 in the relay 47 and then through lead 44 to one side of the line at switch 39. The other end of the field winding of motor 107 completes the circuit through line 108, through terminal 84 of switch 83, through lead 86 to the other side of the line switch 39. From terminal 45 several lines extend including one through coil 46 of said relay by connector 133 to terminal 134 of the upper switch of the double-pole relay 90, through bridge piece 135 when relay 90 is actuated "in," and through contact 136 and connector 137 to the terminal 138 of relay 49. The coil 131 of the latter relay is always energized, so long as limit switch 20 is closed, and the circuit goes from switch 39 of the line, connector 44, terminal 45, connectors 144 and 145, through switch 20, through connector 164, through coil 131, terminal 6 and lead 41 back to the line. When the relay 49 is "in" the upper relay circuit is then from contact 138 through bridge piece 140 through connector 41 to the power line. Connected to terminal 6 of bridge piece 140 is the connector 141, leading from bridge piece 140 of the relay, through relay coil 142 of the relay 90, and through connector 143 to the bar of limit switch 21 of the valve operator. If the limit switch 21 is closed (as it and switch 20 both are, preferably, during normal valve operation within the predetermined limits), the circuit is then through the bar 21 through the common return 144 to the terminal 45 of the double-pole relay 47 and through connector 44 to the power line. The fixed contacts of limit switches 20 and 21 are joined by a line 145 and with a return lead from the reversible valve actuating (condition varying) motor 18 through connector 146 common to both field windings 16 and 17.

The field winding 16 of the reversible valve actuating motor connects through a lead 147 to the lower switch or bridge member 148 of the double-pole relay 90, and when the coil 142 of the latter relay has been energized, it brings the lower switch or bridge member 148 into contact making position with the terminal 88, and through connector 87 the circuit extends to one side (58) of the bridge circuit relay, as has been described. Terminal 88 of switch 148 of relay 40 has another connector 150 which leads from terminal 88 to terminal 91 of a hand "open" switch 93. The field winding 17 of motor 18 leads through a connector 151 to the terminal 152 of the lower switch of the relay 49 which, when energized, then connects through bridge piece 153 with the previously described terminal 103 and in one direction through lead 104 to the other side (60) of the bridge circuit relay, while in the other direction, it leads through connector 102 to the terminal 101 of the switch 99 as previously described.

The slidewire movable element or arm 23 in association with the valve operating linkage and motor, connects through a connector 155 to coil 55 of the bridge circuit relay and through the reversed coil 56 thereof, through a line 156 to the movable slidewire element portion 32 of the actuating instrument. In the normal balanced relation of the bridge circuit, the resistance between arm 23 and the terminal 25 on slidewire 24 should equal the resistance between arm 32 and terminal 30 of slidewire 28, and in this situation no current flows in either direction through coils 55 and 56 of relay 50.

One side of a circuit extends from the line at switch 39 through connector 44, terminal 45, connector 132, interrupter bar 112, contacts 113 and 114, and connector 115 to contact 166. When the latter engages and establishes contact with low contact 34, a load compensating running of motor 73 is accomplished, by completing a circuit as follows: through contact 34, and line 157 to the upper terminal 158 of the lower switch of the double-pole relay 47. If relay 47 is "in," the circuit continues across the movable bridge piece 128 thereof then through line 130, motor field 75, return 105, terminal 106, connector 108, to the line switch 31 through terminal 84 and connector 86 previously described. The high contact 35 in the actuating instrument when contacted by the movable element 166 of arm 32, establishes a circuit therethrough and through a connector 160 to the upper terminal 161 of the upper switch of the multiple relay 47, in position to be engaged by the movable bridge member 123 thereof, to close the circuit through connector 124 and through field winding 74 of the reversible motor, when the bridge member 123 moves off contact 122 and on to contact 161 as the relay snaps "in."

Referring to the lower half of the second figure of the drawings, the schematic system of balance and of operation of the Wheatstone bridge circuit is indicated. The instrument slidewire 28 between its terminals 30 and 31, and its arm 32 represents one side of the bridge circuit, of which the valve-coupled slidewire 24 between its terminals 25 and 26 and its arm 23 is the complement. Rheostats 66 and 72 complete the bridge circuit. With the rheostats or potentiometers 66 and 72 balanced in a mid-position, then, if the movable pointer 32 is adjusted on the slidewire 28 in response to thermal changes recorded by the pyrometer 33, within a range which is preselected for the instrument, it will be clear that balance in the bridge circuit will be attained when the movable pointer 23 of slidewire 24 responds to changes in valve setting in what is designated as a "relatrol" follow-up relationship in which current flows neither way in coils 54 and 56. This may be designated as a symmetrical balanced relationship. In other words, the distance that the pointer 32 "balances off" away from terminal 30 of the instrument slidewire will be the same as the distance from terminal 25 that the pointer 23 "balances off." This symmetrical relationship is not necessarily the maintenance of a proper temperature control as it cannot adapt itself to variations in load conditions, which inevitably require an asymmetrical relationship of balance of the pointers.

As has been pointed out, for many reasons this direct "relatrol" control utilizing symmetrical balancing is not universally satisfactory. There has developed in the art a factor of "load compensation" by changing the settings of potentiometers 66 and 72, by means of which variations in the relative settings of temperature and valve setting can be obtained which is designated as asymmetrical relationship. In other words, "load compensation" is provided in order to permit "balancing off" of a valve setting and of a temperature setting, where the temperature is within the proper range with the valve setting proper to maintain the proper temperature, but not necessarily with the valve substantially half open as would follow straight "relatrol" functioning. In securing this compensation by synchronously and simultaneously varying potentiometers 66 and 72, it has been, in effect, as though the Wheatstone bridge circuit was swung as an entity about its center and effectively angularly shifted, without actually disturbing the slidewires. To accomplish this in an expeditious manner, although any other variable resistances may be used, the respective sides of the Wheatstone bridge circuit, as noted, are formed of rheostat 66 connecting terminals 30 and 25 of the respective slidewires, and rheostat 72, coupling the terminals 31 and 26 of the slidewires, and the rheostats are arranged for synchronous, automatic, or manual variation. For purposes of this discussion, it will be assumed that potentiometers 70 and 76 are at zero setting, as shown in dotted lines so as not to affect the functioning of potentiometers 66 and 72.

The movable element 65 of rheostat 66, and element 79 of rheostat 72, are preferably coupled so that they can be shifted together oppositely either way from the generally central position indicated in Fig. 2, to extreme positions in which, for instance in one direction of shift the arm or pointer 65 may be moved until the pointer is close to the upper terminal of rheostat 66 (indicated in dotted lines). Simultaneously pointer 79 of potentiometer 72, would be close to the bottom terminal of rheostat 72, as also indicated in dotted lines. To maintain the pointer 32 at the center of slidewire 28, and yet to shift pointer 23 of slidewire 24 to points of variable asymmetrical relationship, according to variations in demand, the load compensating rheostats must be shifted so as to add resistance on one side of the circuit (and withdraw it from the other) so as to cause the pointer 23 to move toward the side upon which the resistance has been added, as, to the position of pointer 23 indicated in dotted lines. Obviously this marks a wide change in valve setting from the "balanced off" symmetrical setting with the potentiometers 66 and 72 in centered position shown in Fig. 2. Arm 23 of slidewire 24 can be disposed over a required or suitable range in its asymmetrical adjustment on slidewire 24, depending upon the direction of shift of the bridge, although short of the limits of slidewire 24. Any further movement of arm 23 to the actual limits of slidewire 24 will be as a direct function of the movements of the pyrometer slidewire arm 32 away from the control point.

This change in relationship of the controlling and responsive instruments imposed by the load compensation adjustment occasions a great swing in the instrument response mechanism in order to secure an adequately wide range of valve movements.

To minimize the swing of temperature response in the slidewire 28 in proportion to the valve movements, added resistance is brought into the circuit by means of additional potentiometers, 70 and 78, respectively coupled to the side arms of the bridge circuit 66 and 72, and arranged for coupled adjustment of arms 163 and 164. This is a manual setting to establish a differential and secure adequate controlling movement of the valve with small movements of the controlling pyrometer responsive arm 32. This may be characterized as a "throttling range adjustment."

It will be understood of the "throttling range adjustment" that the arms 163 and 164 thereof move simultaneously in the same direction relative to their respective resistance units 70 and 78 to secure an effective extension of the length of slidewire 24 by the added resistance at its ends which is very effective to secure close control when the furnace has come up to temperature and is running under normal operating conditions. After the proper throttling range adjustment is secured, to decrease the effective pyrometer throttling range by securing what is in effect a micrometer adjustment, this remains as a substantially permanent setting of the control.

The disadvantages of permanent retention of load compensating adjustment have been most noticeable and objectionable in situations where the valve has been moved to an extreme position, either opened or closed pursuant to the temperature going or remaining away "off." Such a situation is presented in starting up a cold furnace (for instance). Obviously if such extreme is reached as it must be owing to the great difference between temperatures in the furnace and at the operating range, the fact that the temperature to which the instrument is responsive continues to be "off," either high or low, cannot push the valve further open or shut, so that there is an "overrun" of the temperature responsive device which must be absorbed upon a reversal of the temperature conditions, and this is not effective to change the valve setting until after the reversal of temperature has moved the indicator an appreciable amount into the throttling range. Owing to the number of ineffective turns over which the pointer 32 must travel before effecting a valve change due to the accrued asymmetrical unbalance of the bridge circuit during maintenance of load compensation adjustment after the valve attains a maximum setting, the temperature inevitably overshoots or undershoots that which is desired. It is as though the valve 12 were actuated by a coiled spring controlled by the contact 166 on pointer 32 on slidewire 28, and by contacts 34 and 35. The deviation winds the spring and moves the valve to an extreme position at which it must stop. The maintenance of the deviation of temperature continues to tighten the coil spring by extra turns without moving the valve. When the temperature ultimately responds to the extreme valve positioning, the spring must unwind all of the extra turns imposed upon it before actual valve movement away from its extreme is possible. The "extra turns" of the hypothetical coil spring are represented by the travel of the pyrometer-responsive indicator toward the control range necessary during the condition of bridge circuit unbalance occasioned by maintenance of load compensation adjustment.

One of the primary objects of this invention is to modify the setting of the load compensation rheostats automatically whenever the setting of the pyrometer or the valve attains a predetermined maximum or minimum value. This resetting function is an important feature of the invention.

It may simplify matters if at this point reference is made to the purely schematic structure and functioning of Fig. 2. In this the power lines 40 and 9 run to the same switch 39. One power line 41 runs along one side to form a connector to which the instrument components are attached and running to one side of the primary 42 of transformer 43. The return line 44 forms the other connection to the return side of primary 42 of the transformer 43. Secondary 63 has one lead running through stabilizing coil 53 and energizes the bridge circuit through the potentiometer arms 65 and 79, as should be clear. (The actual wiring of Fig. 1 is not identical with the schematic lay-out of Fig. 2.)

A line 146 extends through valve controlling motor 18, common to one end of both field windings and to one end of both limit switches 20 and 21 through connector 145. When both are open as shown in Fig. 2, for illustration (which actually can never occur), the circuit through the actuating coils of both relays 49 and 90 must fail and both relays are dropped "out." To complete the power circuit through lines 146 and 145, around the motor 18, a connector 165 extends from the fixed contact of limit switch 20, through coil 131 of relay 49, to return line 44, and when limit switch 20 is closed, coil 131 is energized and the relay 49 is moved "in." An analogous line 143 runs from the fixed contact of limit switch 21 through coil 142 of relay 90 to return 44 so that when limit switch 21 is closed the coil 142 of relay 90 is energized and the relay held "in." In normal valve positioning, as noted, both relays 90 and 49 are held in.

The power line connection to the switch elements of the relays just mentioned is through the coil 17 (for running the motor in one direction, for instance "closed") through line 151, bridge piece 153 (normally raised) and lead 104 to contact 60 of the bridge relay. If everything is in balance the current goes no further and motor 18 is not automatically actuated. However, upon unbalance and engagement of contact 60 by moving contact 57, the circuit is completed through beam 50, switch 85 to line 44 and the valve motor is driven in one direction. This stops, in one instance, where limit switch 20 is actuated to drop out relay 49 and open switch 153, thereof, and in another instance by reestablishment of balance in the bridge relay and breaking of the engagement between contacts 57 and 60. It is also broken by opening of switch 83.

If it is desired to run the motor 18 in the direction of winding 17, under manual control, the switch 83 is opened and control bridge member 86 is swung to "hand" position, with bridge 85 engaging contact 96, and through connector 95 and switch 99 and connector 102 to close a circuit by-passing the bridge relay contacts 57 and 60.

For automatic control of field winding 16 for running the valve motor in the other direction (toward "open," for instance) a connector 147 leads through bridge element 148 of relay 90 and through lead 87 to bridge relay circuit contact 58. When the bridge relay has moved to engage contact 58 by movable contact 57, the circuit is completed through switch 83 and its bridge piece 85 to the return 44. As with the other circuit through field winding 17, the system is arranged to permit the closing of a circuit by-passing bridge relay contacts 58 and 57, by providing a switch 92 having a bridge piece 93 and connecting with line 87 by connector 150, bridging through switch 92, line 95 and through bridge piece 85 to the return line 44.

It is to be observed that with both relays 49 and 90 "in," the upper bridge members thereof establish a circuit through the coil 46 of double throw double pole relay 47, through the upper switch members 135 and 140, as will be clear, as will the fact that if either relay 49 or 90 drops "out," because its associated limit switch drops out, then double switch relay 47 also drops "out."

The motor 73, which is the load compensation motor driving the arms 65 and 79 of rheostats 66 and 72, as has been explained, is controlled in its driving relation by the two switches controlled by relay coil 46. With the relay 47 held "in" a motor actuating circuit is established through the interruptor 107 and selectively through contact 166 (on pointer 32) and through either low contact 34, or high contact 35. Contact 35 through connector 160 leads to contact 161 of the upper switch, which being engaged by bridge 123 closes a circuit through motor winding 74. Contact 34, through connector 115 leads to contact 158 engaged by bridge piece 128 when the relay 47 is "in," and through winding 75 to the return.

A feature of importance lies in the resetting cam 139 which is mounted on shaft 69 driven by motor 73. The cam and the coupled potentiometer arms 65 and 79, are arranged for an angular swing of 180° at the extremes of which the potentiometer arms are at their respective limits of travel, and the arrangement of the cam faces 149, 159 and the slope 169 is such that when the potentiometer arms are in a central position, (and the load compensation adjustment is nil and straight symmetrical "relatrol" functioning can occur) the resilient arm 117 carrying double contact 118 is held in the middle with contact 118 out of engagement with either of the fixed contacts 120 or 125, because the protuberance 179 is resting centrally of slope 169 of the cam.

Obviously any load compensation adjustment that is made, as motor 73 is caused to run in one direction or the other, immediately forces the protuberance off the slope to ride either on the high cam 159 or the low cam 149, and consequently to establish contacting engagement between double contact 118 and either of the fixed contacts 120 or 125. However, this causes no completion of an entire circuit as long as relay 47 is held "in," which is as long as valve 12 is not so close to its limit of movement as to open either limit switch 20 or 21. However, when such extreme valve movement does occur, as when starting up a coal furnace for instance, or in chilling a heat-saturated furnace, as explained, dropping out either relay 49 or 90 will break the circuit through coil 46 of relay 47. This causes upper bridge member 123 to break circuit with contact 161 and to establish a circuit with contact 122, and through lead 121 to contact 120 and if this has previously been engaged by contact 118 on the bar 117, the actuating current is through lead 116, bar 117, contacts 118, 120, lead 121, contact 122, bridge piece 123, lead 124, winding 74, return 105 to line 44. This circuit will thereupon run motor 73 until cam 139 has been moved to a position to break the circuit through contacts 118 and 125. At this position the load compensation rheostats will have been moved back to their balanced mid-position.

On the other hand, if the middle contact 118 has engaged contact 125 when relay 47 drops "out," then the actuating circuit, with an identical arm and potentiometer actuation as has been described, will be through lead 116, bar 117, contacts 118, 125, lead 126, contact 127, switch member 128 of relay 47, connector 130, field winding 75, and return 44.

Thus the load compensation is automatically reset to "zero" whenever the valve attains a maximum setting.

While the actuation of the resetting mechanism to reestablish symmetrical balance as accomplished through the extreme positioning of the valve is in effect a functioning of the pyrometer instrument, it is an indirect effect although representing broadly a predetermined change in the system which effects the resetting. Certain advantages attach to controlling the resetting directly from the pyrometer slide wire as another predetermined change in the system effecting resetting. In the form of control so far described, it will be seen that the limit switches on the valve are the "feelers" by which the position of the valve is determined, and in most situations this is satisfactory. There are, however, many situations of asymmetrical relationship in which the pointer 32 is properly within the throttling range and even at the control point, while the valve is almost at its extreme limit in asymmetry so that a slight deviation of the pyrometer from the control point forces the valve the slight additional movement which effects a predetermined change in the system which attempts to effect resetting to restore the symmetrical relationship, with the result of establishing hunting. There is therefore, in the valve-coupled resetting system, a limit upon the amount of asymmetry that can be developed in the system. With the control of the resetting coupled either directly, or indirectly, or effectively, to the pyrometer slide-wire assembly, arranged for actuation when the arm of the pyrometer slidewire touches points at the end of the throttling range regardless of the valve positioning or setting, the ideal condition is achieved. This is because it permits 50% of asymmetry and avoids the compromise of the con-asymmetry and avoids the compromise of the valve controlled resetting, which necessarily represents a compromise of the conflict between input of asymmetry and overshooting.

It will be understood that many control installations provide a pyrometer instrument with which separate units are associated to make a complete system, as it will also be clear that the very pyrometer instruments themselves can be suitably modified as to incorporate the features of the system that has been in part and which still remains in part to be described, obviating the production or use of collateral units. The association of control switches with the pyrometer slidewire may be actually in the pyrometer instrument, or effectively therein, by providing a duplicate agency in a separate attached unit, in which the agency is positioned as a function of the position of the slide wire arm of the pyrometer. The systems will be similar in many respects, but obviously the complete system in the pyrometer instrument which will be described in connection with Fig. 3 will represent the simplest form of system. The parts distinguishing Fig. 3 from Fig. 2 will be pointed out, in connection with the parts which are the same in both systems.

Figure 3:
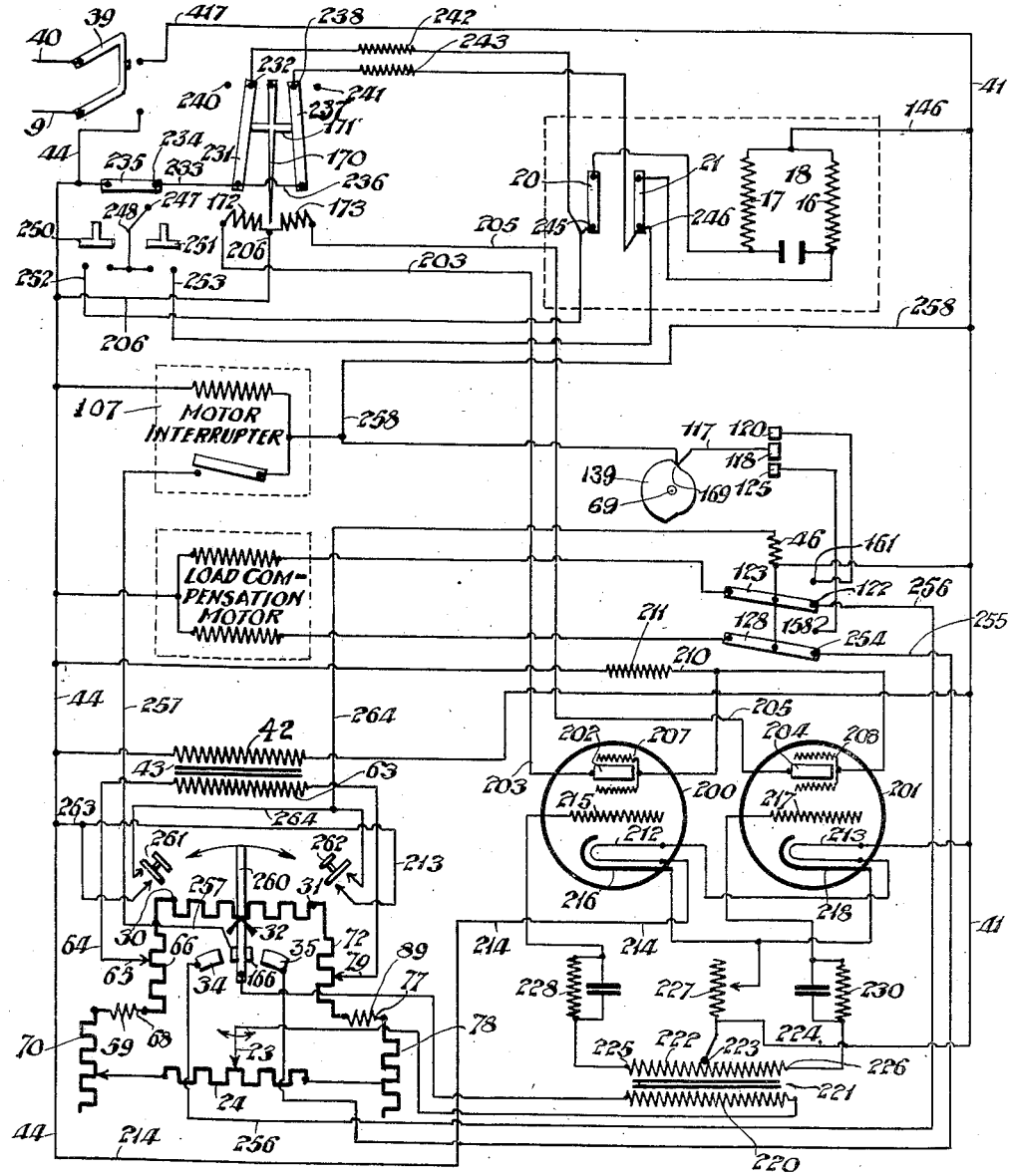
Fig. 3 represents a wiring diagram of the control system of this invention in its simplest form as a unit in a pyrometer instrument.

Referring to Fig. 3, the "balancer" thermionically controlled bridge relay of the instrument, operating in the Wheatstone bridge circuit, may be of any desired sort, as for instance, the Macgeorge relay noted, but preferably it comprises a pivoted beam or arm 170 carrying a cross-bar 171 and normally spring pressed to a neutral mid-position. The end of the arm 179 is in operative relation respectively to the relay coils 172 and 173, being selectively alternately energized in one way or the other only during and as a result of conditions of unbalance in the bridge circuit. Beam 170 from a stable mid-position moves small distances between switches to be described. The secondary winding 63, of transformer 43 is connected through lead 64, directly to the adjustable wiping element 65 of load compensating potentiometer 66. The other side of the potentiometer 66 connects through a lead 68, preferably containing a small resistance 59, to throttling range potentiometer or rheostat 70.

The driven arm 79 of the complemental load compensating potentiometer 72, is connected to the other end of secondary coil 63. The potentiometer 72 connects on the lower side through connection 77, preferably containing a small resistance 89, to the complemental throttling range resistor or rheostat 78.

Figure 4:
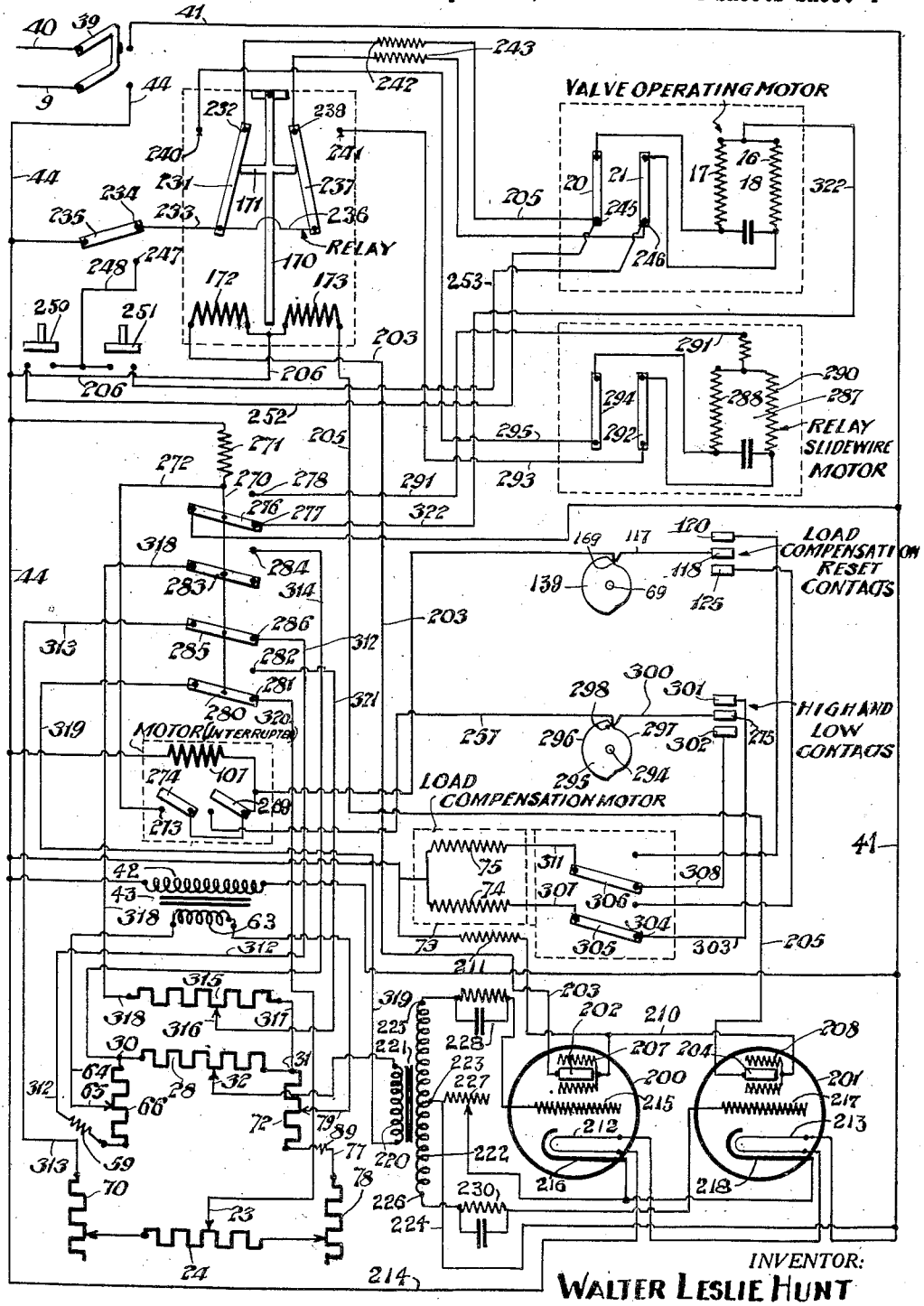
Fig. 4 represents a schematic wiring diagram showing the control system of the invention as incorporated in a separate unit for association with a pyrometer instrument, whereby "effective" identical operation is attained.

A thermionic circuit is used as the relay actuating medium with enhanced efficiency of the whole, in the form of invention disclosed in Figs. 3 and 4, and the same is also available for the form shown in Figs. 1 and 2 if desired, as will be understood. The thermionic circuit preferably utilizes two pentodes, 200 and 201, with which if desired additional amplification may be associated. Plate 202 of tube 200 through connector 203 leads to one end of relay coil 172. Plate 204 of tube 201 through connector 205 leads to an end of relay coil 173. The inner ends of relay coils 172 and 173 lead through common return 206 to line 44. The screens 207 and 208 of the respective tubes are connected in parallel through a connector 210 containing a resistance 211, to the line 44. The respective cathode heaters 212 and 213 are connected in series with a connector 214 bridging across both power lines 44 and 41. Tube 200 has a grid 215 and a cathode 216, tube 201 has a grid 217 and cathode 218, the connections to which will be described.

The pointer arm 32 of the pyrometer slidewire connects with the primary coil 220, of an input transformer 221, having a secondary 222, and is also connected to the pointer arm 23 of the valve-positioned slidewire 24. It will be clear that unbalance of the bridge circuit causes a flow in one direction or the other, instantaneously, through the primary coil 220 of the input transformer. The center tap 223 of the secondary 222 of this transformer is joined through connector 224 to lead 41, and it will be clear that instantaneously the induced flow in secondary 222 at the respective upper and lower (or left and right) terminal taps thereof, 225 and 226, will be respectively more and less positive than the center tap 223 (assuming standard 110-120 A. C. in the power lines). The center tap 223 of the secondary 222 leads, through a cathode bias 227, to the cathodes 216 and 218 in parallel. As the upper tap 225 of the secondary leads through a phase-relation coupling 228 to grid 215 of tube 200, and lower tap 226 leads through a phase-relation coupling 230 to grid 217 in tube 201, it will be clear that the plate of the tube in which the grid is less negative than the cathode will be energized so as to actuate its coupled relay coil of the coils 172 and 173. Thus unbalance of the bridge circuit, through actuation of the appropriate coil 172 or 173 swings the switch arm 170 from its mid-position.

The switch assembly of which arm 170 is the center, comprises a switch element 231 normally abutting the cross piece 171 in engagement with the live contact 232, and connected through line 233 to a pole 234 of the automatic and hand control switch 235, connected through its common pole to the line 44. Connector 233 through common connector 236 also engages with switch member 237. The latter normally abuts the cross piece 171 and engages the live contact 238 of the switch. In the form of invention shown in Fig. 3 each switch also includes a supplemental alternative contact or pole, respectively 240 and 241, which being out of operative connection may be designated as dead. In Fig. 4, however, these poles are used, as will be pointed out. The live poles or contacts, respectively 232 and 238, lead through resistances 242 and 243 to the poles 245 and 246 respectively, of limit switches 20 and 21. As in the other figures, the limit switches are in the line with the respective fields 17 and 16 of the valve-operating motor 18, joined by common return 146 to the line 41. It will be understood that with the switch arm or beam 170 in the mid-position, and thus with the circuits closed through both fields of motor 18 through the resistances, the motor 18 will be held stationary. On the other hand, movement of the beam 170 in one direction, say to the left, in response to actuation of the relay coil 172, pursuant to the actuation thereof by the plate circuit of tube 200, will open the switch comprised of member 231 and pole 232, thus cutting the line through resistance 242, limit switch 20 and field 17. This will permit the circuit still made in field 16 to run the motor 17 in one direction until limit switch 21 is opened to open the circuit through field 16, or until the bridge circuit is again balanced and the plate circuit deenergized in tube 200 and the relay coil 172 is thus deenergized to permit the beam 170 to return to mid-position, to automatically close the circuit through field 17 by bringing switch member 231 back into circuit-making engagement with pole 232. Obviously operation of the relay coil 173 secures a similar but reversed operation of motor 18 actuating the valve. This is in the automatic operation of the parts.

For hand operation, the switch 235 is moved away from pole 234 to engage pole 247, which energizes the common line 248 for both hand switches 250 and 251. Switch 250 closes the circuit between the common line 248 and a connector 252 leading to limit switch pole 245, while switch 251 closes a circuit between the common line 248 and a connector 253 leading to the pole 246 of limit switch 21. Use of the hand switches to actuate the valve to a desired position will be clear.

The double throw relay 46 of Fig. 2, is slightly changed in its connections in Fig. 3 so as to be actuated "up" when the throttling range limit switches to be described are closed. In the open or dropped position shown, the lower switch 128 rests upon a pole 254 leading through connector 255 to the high contact 35 in the pyrometer instrument, in position to be engaged by the contact-making insulated portion 166 of the pyrometer arm 32. Lower normally "made" contact or pole 122 of switch 123 leads through connector 256 to the low contact 34 of the pyrometer instrument. The pyrometer arm contact-making portion 166 through connector 257 extends to the pole of the circuit-making interrupter 107, to be intermittently energized as the latter is continuously driven by a closed line 258, bridging the two power lines 41 and 44 through the field of the interrupter motor 107.

The upper poles of the respective switches of the double throw relay 46 couple the respective fields of the load compensating motor 73 with the contacts controlled by the load compensation resetter cam. Thus, upper contact 120 is engaged with the upper pole 161 of switch 123, while lower contact 125 engages the upper pole 158 of switch 128. The cam 139 driven by shaft 69 having the controlling intermediate slope 169 controls the wiping element 117 which is energized by lead 258 running to line 41, and this places its center contact 118 in the circuit. Thus, in accordance with the direction of running of motor 73 the appropriate circuit from center contact 118 through contacts 120 or 125 is made when the relay 46 is energized out of its dropped condition.

It is a feature of importance in this phase of the invention that the pyrometer wiper arm 32 have an actual or effective extension 260 in such position as to close throttling-range limit feeling switches respectively 261 and 262 when the pointer 32 reaches its terminals 30 and 31, on its way out of the throttling range in either direction. The switches are disposed in parallel and have on one side a connection to lead 44 as at 263, and on the other a common lead 264 leading through coil 46 of the double-throw relay to the other line 41.

With this form of invention it will be clear that the valve may attain any position of asymmetry relative to the pyrometer arm with perfect safety in "balancing off," as the resetting of the relation to a condition of symmetry can only take place when the pyrometer arm itself attains or passes the limit of its throttling range. In order to avoid difficulty about possible hunting as a result of opening and closing of valve limit switches, the extra resistances 59 and 89 between the load compensating potentiometers and the throttling range adjustment are just sufficient to retain a little resistance in the circuit to keep the bridge circuit slightly unbalanced while the limit switch is open.

It will be understood that everything is controlled from the pyrometer arm itself in this form of the invention, as the closing of the high or low contact actuates the load compensating motor to create, then to augment, the asymmetrical disposition of the valve pointer and the pyrometer pointer, and thus to close contact 118 with either contact 120 or 125 in anticipation of the need for resetting. Pursuant to this, when the throttling range limit is reached, so that a switch 261 or 262 associated with such limit is closed, the relay 46 is actuated to complete the circuit which was thus previously preselected, to run the load compensation motor in such direction as to change the asymmetrical relation back to symmetrical relation which in the normal course will require the temperature to exceed the throttling limit for a perceptible time interval, which for example may be of the order of fifty seconds, in the preferred embodiment. When the pyrometer arm begins to return from its over extension to and past the limit at the edge of the throttling range and the limit switch thereof closes and relay 46 drops, the valve motor is then only actuated, as a function of unbalance in the bridge circuit working in symmetry, so that the previously closed and continuously thereafter made high or low circuit, which is maintained during the entire swing of the pyrometer from the control point through the limit of the throttling range, working at the rate determined by the interrupter, begins to reestablish an asymmetrical relationship between pyrometer indicator and valve indicator. This continues during the entire movement of the pyrometer indicator toward the control point. The important thing is that the movement of the pyrometer-arm beyond the throttling limit, manifests the existence of circumstances requiring a return to the symmetrical relation for balance and this existence causes the reestablishment of the symmetrical relationship. In the form of invention of Figs. 1 and 2, the movement of the valve past its limit switch is also a similar or related manifestation causing the same reestablishment. This is so that the return of the pyrometer to the throttling range finds the valve in a situation to be controlled, instantaneously at least, in symmetry, and thereafter in a slowly increasing asymmetry, whereby the previously stored asymmetry is "shed" or lopped off and disappears on the return movement of the pyrometer indicator or arm.

It is an important characteristic of the invention that upon a predetermined change in the system, the previously stored or accumulated asymmetry is wiped out, so that instantaneously at least (after a lapse of the illustrative fifty seconds), the asymmetry is non-existent and the regulation picks up anew from a symmetrical relation, say with both the pyrometer arm, (actually or effectively) and the valve operated arm at the same side and in the same proportion of their respective ranges and movement.

In other words, the asymmetrical relationship is one that exists and progresses without regard to proportionality of movement of the respective arms relative to their slidewire ranges, while the symmetrical relation is definitely proportioned relation of the two movable arms on their slidewires. Of course, it begins, almost immediately, to lose its proportionality and to develope asymmetry, but the advantage of "untying" the accumulated asymmetry from the control has been accomplished at the time it was necessary.

It has been mentioned that the pyrometer control of the resetting may be either direct, as by building the circuit into the pyrometer instrument, or it may be effective or indirect by providing a unit for association with the pyrometer instrument. The circuit shown in Fig. 4 constitutes a disclosure of the indirect or effective control by the pyrometer arm in a preferred embodiment with all of the functional advantages of the system of Fig. 3.

Referring to Fig. 4, the primary distinction from Fig. 3 is the provision of components which in association with the slidewire of the pyrometer comprises a secondary bridge circuit, by means of which a substitute, false, follower, or relay pyrometer-indicator is provided in the secondary bridge circuit arranged for constantly symmetrical follow-up of the pyrometer of the primary bridge circuit, and with which effective pyrometer arm, in the separate unit the high and low contacts and also the resetting controls are operatively associated.

The primary bridge circuit is made up of the elements discussed of the bridge circuit of Fig. 3, except for such changes as enable this circuit to be cut in or out, in alternation with the secondary bridge circuit to be discussed. There is provided an electromagnetic gang switch or four-throw relay 270, the coil 271 of which connects at one end with line 44, and at the other through connector 272 connects to pole 273 of switch 274 arranged in intermittent driving relation to the interruptor motor 107, in alternation to the operation of the timed switch 269 between line 258 from main lead 41, and connector 257 running to the center contact 275, of the high and low contact assembly to be described. The relay 270 includes an upper double pole switch member 276, which in the dropped-out position (shown) engages a pole 277, from which it is movable to engage a pole 278, and a lower double-pole switch member 280, in one alternative position engaging the pole 281 from which it is movable to engage pole 282. Coupled to the relay 270 are the two intermediate single pole switches respectively 283, arranged to be open in the dropped-out position and to be moved into closed position with a pole 284, and the switch member 285 which is closed with pole 286, as shown in dropped-out relation, and arranged to break upon energization of coil 271.

In order to actuate the effective secondary or follow-up pyrometer slidewire indicator 316 to be described, there is provided a relay slide wire motor 287, having field windings 288 and 290, joined in a common return leading through connector 291 to what is shown as the disengaged pole 278, of the double pole switch 276 of the relay 270. The field winding 290 leads through limit switch 292 through connector 293, to the pole 241 of the relay switch 237. Similarly field winding 288 of the motor 287 leads through limit switch 294 and connector 295 to the pole 240 of the complemental relay switch 231 in the thermionic circuit.

The relay slide wire motor 287 drives a shaft 294 upon which there is mounted a cam 295 preferably having a profile similar to cam 139, and having a high area 296, a low area 297 and an intermediate slope 298. A wiping rider arm 300 carrying center contact 275, and electrically engaging connector 257, is disposed in evenly spaced relation between a high contact 301 and a low contact 302 when the rider is contacting the intermediate slope 298 of the cam, at the effective control point of the effective slidewire arm substituting for the actual slidewire arm, as will be described. High contact 301 leads through connector 303 to pole 304 of the lower double pole switch 305 of the coupled reset contacts 305 and 306, and through connector 307 to the field 74 of the motor 73. Low contact 302 leads through connector 308 to switch 306, and from the latter through connector 311 to the field 75 of motor 73. The double switch 305, 306, is mechanically or otherwise coupled to the shaft 294 actuated by the relay slidewire motor, to be raised to break the contacts shown, at the limits of the stroke of the shaft 294 equivalent to the transition through the entire throttling range of the real as well as the secondary or false pyrometer slidewire, to be described.

The primary bridge circuit of Fig. 4 differs slightly from that of Fig. 3 in that although the connection between load compensation potentiometer 72 to the rheostat 78 is always closed, and may include the small additional resistance 89 if desired, that between the potentiometer 66 and rheostat 70 is only closed intermittently. This is accomplished by connecting the lower terminal of the potentiometer 66 through connector 312 to pole 286, of switch 285 and through the latter and connector 313 to the upper end of rheostat 70. Whenever this circuit is made, the circuit to be described through the secondary bridge circuit is broken, and vice versa.

In the unit assembly for association with the pyrometer instrument there is provided a false slidewire 315, having a movable arm or pointer 316, the position of which is controlled by movements of the motor 287. The follow-up slidewire, forming one wall or portion of the secondary bridge circuit, is permanently coupled through connector 317 to the master pyrometer slidewire at its terminal 31 on one side. The other side of the secondary bridge circuit is closed only when the primary is open, as noted, by means of a connector 318 running to switch 283, shown open, but capable of movement to engage pole 284. The latter pole through connector 314 joins terminal 30 of master slidewire 28. It will be clear that the movement of relay 270 in and out switches from the primary to the secondary bridge circuit and vice versa.

The secondary or substitute pointer 316 is always maintained in symmetrical relationship to and follows up the position of the pointer 32 in the pyrometer slidewire, regardless of the condition of asymmetrical relationship that may exist in the primary bridge circuit, as the two upper slidewires comprising the secondary circuit are in parallel. The pointer 32 connects with the primary 220 of the input transformer, and selectively either with the valve positioned pointer 23 in the primary circuit, or with the pointer 316 in the secondary circuit, by means of connector 319 running to switch 280, and completing a circuit alternately with lower pole 281 and through connector 320, as shown, to lower or valve pointer 23, or through pole 282, and connector 321 to pointer 316 of the effective pyrometer slidewire 315. The coupling of the thermionic relay to the thermionic circuit is similar to that of Fig. 3, except that alternately the actuation of the beam member 170, by the respective relay coils 172 or 173, effects movement of either the valve operating motor 18, or the slidewire operating motor 287, in accordance with the timed positioning of the switch 276, inasmuch as the common return from motor 18 indicated at 322 is to pole 277 of switch 276, while that of motor 287 (291) is to the opposite pole 278.

The use of the real pyrometer slidewire as the control medium for positioning a secondary pyrometer slidewire as well as the valve positioned indicator, and utilizing the same thermionic circuit for the purpose, with all of the simplification involved, is considered highly advantageous in the provision of a unit for attachment to an existing pyrometer instrument.

It will be clear that the actual functioning of the electrical circuit will vary in accordance with the actual magnitude of conditions in the conditioned device, but in general may be said to be somewhat as follows: With the electrical system in balance, and with the physical members out of balance, that is, disposed in disproportionate relations of asymmetry, the electrical system balance is asymmetrical. Deviation of the magnitude responsive instrument arm in response to existing departure of the magnitude of condition of the device from the desired magnitude of condition thereof, causes the electrical system to become unbalanced by adjusting the load compensating rheostats further toward asymmetry. This unbalance of the electrical system creates a situation from which in due course an urge is developed to actuate the valve still further in non-linearity or asymmetry (physical asymmetry), the rate of development being variable with changes in the interruptor as will be clear. When proper physical asymmetry is attained, with the electrical system again in balance (asymmetrical) the existing magnitude of condition has been "balanced-off" against the existing application of the condition affecting medium and the proper balanced condition exists.

In the form of device of Figs. 3 and 4, it will be clear that all of the preceding control functionings of the entire system after a symmetrical balance will have created such asymmetrical positioning of the physical parts as to be in asymmetrical balance electrically, while the magnitude positioned pointer may be anywhere on its entire range of movement on its slidewire. The agent applying positioned member may also be similarly positioned through its entire range up to its limit. Thus at the moment that the instrument slidewire pointer is about to actuate its limit switch at one end of its range, the indirectly coupled agent applying responsive pointer may be close to its limit on its range on either end, or in a median position according to circumstances.

Assuming the agent applying pointer spaced from its limit when the instrument pointer attains its limit, then, if this concomitant opening of the instrument limit switch maintains for the predetermined interval (illustratively 50 seconds) then the coupled potentiometers will be actuated to restore the load compensation to zero or to their mid-position, to create a situation of electrical unbalance in the electrical system that can only be brought to actual electrical balance by symmetrical, physically balanced positioning of the magnitude responsive instrument pointer and the agent applying pointer. Pursuant to this electrical unbalance the agent application will in due course be actuated to bring its pointer to physical balance with the instrument pointer and thus to complete the attainment of electrical balance.

Of course, if the agent application attains its limit at the same end and substantially at the same time as the instrument attains its end and limit, the electrical system will still have been actuated to a condition of asymmetrical balance and despite the fact that the pointers of both agencies are in physical balance, the circuit needs to be unbalanced toward symmetry.

The same is true of the forms of invention of Figs. 1 and 2 in that the electrical asymmetrical balance is broken and the electrical system is placed in a condition of unbalance that can only be satisfied (and balanced) by physical balance of the instrument and agent applying pointers, following attainment of the limit of its range by the latter pointer. If the instrument pointer is close to its control point, at this time, this may introduce some degree of hunting, but this is not sufficiently objectionable as to militate against the utility of the system.

Of course, it is extremely unlikely in either type of device that the breaking of the limit switch would find the electrical system in actual symmetrical balance, and therefore, in each case the first result of the limit switch actuation is unbalancing the electrical system, then "reconditioning" the unbalanced electrical system to a condition in which physical symmetrical balance, or proportionate positioning or movement of the respective pointers is necessarily in existence before the electrical system can be placed in actual symmetrical balance. This therefore removes all accumulated or stored asymmetry and enables prompt control of the magnitude of the condition to restore it to the desired magnitude without the time and distance delays that so far as can be determined have always attached to all prior controls offered to the public.

The advantages of the invention will be evident to those skilled in the art, as will the fact that many changes may be made in the invention without departure from the spirit thereof, and all such are to be construed as within the scope of the invention, unless otherwise specifically excluded in the appended claims.

Having thus described my invention, I claim:

1. In regulators for controlling the magnitude of a condition of a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system cooperably associated with both of said agencies and effective to actuate the agent-applying-control means affecting the condition to permit a balancing-off of the two agencies to disproportionate positions according with balance between the desired magnitude of the condition of such device and the application of the magnitude affecting agent to such device regardless of relative proportionality of position of the respective agencies in response to departure of the magnitude of the condition from a desired magnitude, and means responsive to predetermined changes in said system for automatically disestablishing the balanced-off disproportionate relation and establishing a balanced-off related proportionality of position of the respective agencies.

2. In regulators for controlling the magnitude of a condition of a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system cooperably associated with both of said agencies and responsive to departure of the magnitude of condition of such device from a predetermined magnitude to actuate the condition-magnitude-controlling means toward reestablishment of the predetermined condition of such device and to effect a balancing-off of the two agencies and of the predetermined magnitude against the application of the agent affecting magnitude in a non-linear relation independent of proportionality of position of the two agencies, and means for securing a predetermined related linear proportionality of position of the two agencies in automatic response to predetermined changes in the system.

3. In regulators for controlling the magnitude of a condition of a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system cooperably associated with both of said agencies and effectively responsive to successive departures or a long continued departure of the magnitude of condition from a predetermined magnitude to actuate the condition-magnitude-controlling-means progressively toward greater change of the application of the magnitude-affecting-agent toward effecting a balancing-off of the two agencies and of the predetermined magnitude against the application of the agent-affecting magnitude in a relation which is independent of proportionality of position of the two agencies, and means automatically responsive to predetermined changes in the system for actuating the condition-magnitude-affecting-control means to a changed applying situation such that the two agencies will be balanced-off in a position of related proportionality of position of the two agencies.

4. In regulators for controlling the magnitude of a condition of a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system cooperably associated with both of said agencies and including a bridge circuit in which the balance of the circuit depends upon the positioning of the two agencies relative to each other in the circuit, means in the system for varying the bridge circuit from a condition in which balance of the circuit can obtain with the two agencies in symmetrical balanced relative positions, to a condition in which balance of the circuit can obtain with the two agencies in extreme asymmetrical unrelated balanced positions, means for effecting an initial symmetrical balanced relation of the circuit and of the two agencies therein, means in the system responsive to departure of the magnitude of condition from the predetermined magnitude to effect a variation in the bridge circuit by which balance can be secured only by asymmetrical positioning of the two agencies, means in the system effective on the said departure of the magnitude for actuating the agent applying means for changing the application toward restoration of the predetermined magnitude of condition of such device, and means automatically responsive to a predetermined change in the system for reestablishing a circuit condition in which balance is attained only by the symmetrical positioning of the said two agencies.

5. In regulators for controlling the magnitude of a condition of a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system cooperably associated with both of said agencies and including a bridge circuit in which the balance of the circuit depends upon the positioning of the two agencies, relative to each other in the circuit, means in the system for varying the bridge circuit from a condition in which balance of the circuit can obtain with the two agencies in symmetrical balanced relation positions, to a condition in which balance of the circuit can obtain with the two agencies in extreme asymmetrical unrelated balanced positions, means for effecting an initial symmetrical balanced relation of the circuit and of the two agencies therein, means in the system responsive to departure of the magnitude of condition from the predetermined magnitude to effect a variation in the bridge circuit by which balance can be secured only by asymmetrical positioning of the two agencies, means in the system effective on the said departure of the magnitude for actuating the agent applying means for changing the application toward restoration of the predetermined magnitude of condition of such device, and means automatically responsive to a predetermined change in the system for reestablishing a circuit condition in which balance is attained only by the symmetrical positioning of the said two agencies, said predetermined change in the system comprising the attainment of the limit of its range by one of the said agencies.

6. In regulators for controlling the magnitude of a condition of a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system defining a bridge circuit, the legs of which include complemental-coupled potentiometers, a thermionic circuit including a relay in operative relation to the bridge circuit and arranged for actuation in response to and in a direction related to the direction of unbalance of the bridge circuit, a reversible motor for changing the application of the condition-affecting-agent to the device, a reversible motor for driving the potentiometers to change the condition of balance of the bridge circuit, means for actuating the potentiometer motor in response to departure of the magnitude of condition from the desired magnitude in said device, said agencies being part of said bridge circuit and capable of asymmetrical positioning therein to establish balance in the bridge circuit when the potentiometers have been actuated to disturb the balance conditions, and means associated with one of said agencies for actuating the potentiometer motor when the associated agency has moved to a predetermined position to return the potentiometers to a position in which symmetrical balance of the circuit is permitted, said relay being operative to actuate the reversible motor for the application of the agent until the respective agencies are in symmetrical balanced relation in the established symmetrical circuit.

7. In regulators for controlling the magnitude of a condition, a device subject to condition, an indicating control agency movable in response to changes in magnitude of condition of said device in accordance with the existing departure of the magnitude of the condition of said device from the desired magnitude, means for controlling the application of an agent effecting the magnitude of condition of said device, an indicating control agency movable in response to variation of the application of said agent, the respective control agencies each having a means establishing a limited range of movement for the associated agency, a system cooperably associated with both of said agencies and their range establishing means and effective to permit a balancing-off of the positions of the two agencies within the limits of their respective ranges to accord with balance between the desired magnitude of condition of said device and the application of the magnitude-affecting agent regardless of relative proportionality of movement or position of the respective agencies within the limits of their ranges, said system including means responsive to the attainment by one of the control agencies of the limit of its movement in its range to automatically disestablish the balanced-off relation and establish related proportionality of position of the respective agencies relative to their ranges.

8. A temperature controlling system comprising a temperature responsive control element, movable means for varying the temperature of a furnace, a control element operatively coupled to the movable means, control mechanism operatively associated with both of the elements to actuate the movable means in a predetermined functional relation to variations in temperature of such furnace, means automatically operative to vary the predetermined functional relation to accord with load variations in such furnace, and means automatically responsive to extreme movements of the movable means to restore the first mentioned functional relation.

9. A temperature controlling system comprising in combination with a furnace, a temperature responsive control element operatively associated with the furnace, a temperature in-put controller including a movable device operatively associated with the furnace, a position responsive control element operatively associated with the said movable device, a control system operatively coupled with the respective control elements and arranged to vary the movable device and the input controller initially as a predetermined function of the variation of temperature within the furnace to establish a predetermined relation between the respective elements, means automatically responsive to furnace load conditions and operatively effective on the control system to modify the initial predetermined functional relation to permit attainment of a different position of the movable device for a given temperature in the furnace, and resetting means operatively associated with the control system for automatically restoring substantially the said initial predetermined relation pursuant to the long continuance of a given predetermined furnace temperature.

10. A temperature controlling system comprising an actuating and controlling indicator responsive to temperature conditions in a furnace, a fuel supply line capable of varying the temperature condition in such furnace, means for regulating the supply going through the line, control means positionable as a function of the position of the regulating means, the first mentioned indicator and the positionable control means being in a bridge circuit which predeterminedly establishes balance between the indicator and the positionable means in a predetermined relation, means for varying the functional relation of the indicator and positionable means, so that a conditions of balance is attained in a different predetermined relation in which the position of the regulating means permits a different fuel supply for a given temperature indication, and means responsive to actuation of the regulating means to a predetermined position typical of a predetermined supply of fuel for temporarily restoring the said first mentioned predetermined relation.

11. A condition controlling system comprising a condition responsive control element, movable means for varying the condition of a conditioned unit, a control element operatively coupled to the movable means, control mechanism operatively associated with both of the elements to actuate the movable means in an initial functional relation to variations in condition of such unit, means automatically operative to establish a different functional relation between the movement of the movable means and the variations in condition of such unit to meet a change in the condition demand of such unit; and means automatically operative to reestablish said initial functional relation.

12. A condition controlling system comprising an electrical bridge circuit, a condition responsive movable control element on one side of the bridge circuit and operatively associated with a conditioned unit, a movable control element operatively coupled to said movable means on the other side of the bridge circuit, said bridge circuit including operating mechanism to move said means in response to unbalance in the bridge circuit, said coupled movable control element having a symmetrical balanced relationship with the responsive control element in the bridge circuit in one operative relation of the parts, said bridge circuit including means for establishing an asymmetrical balanced relationship between the movable and responsive control elements in another operative relation of the parts, said bridge circuit further including means automatically operating to temporarily reestablish said symmetrical balance.

13. In regulators for controlling the magnitude of a condition, a device subject to condition of variable magnitude, a condition indicating control agency movable in response to the departure of the magnitude of the condition from that which is desired, means for controlling the application to such device of an agent affecting the magnitude of condition thereof, an application indicating control agency movable in response to variation of the application of said agent, a system cooperably associated with both of said agencies and responsive to a predetermined departure of the magnitude of condition from the desired condition of such device for actuating the application-controlling-means for an adjusted position of an included differential from the position of the magnitude of condition agency, said system responsive automatically to a predetermined greater departure of the magnitude of condition from the desired magnitude of condition to erase said differential from the positions of the respective agencies.

14. In regulators for controlling the magnitude of a condition, a device subject to condition, an indicating control agency movable in response to changes in magnitude of condition of said device in accordance with the existing departure of the magnitude of the condition of said device from the desired magnitude, means for controlling the application of an agent affecting the magnitude of condition of said device, an indicating control agency movable in response to variation of the application of said agent, the respective control agencies each having a means establishing a limited range of movement for the associated agency, a system cooperably associated with both of said agencies and their range establishing means and effective to permit a balancing-off of the positions of the two agencies within the limits of their respective ranges to accord with balance between the desired magnitude of condition of said device and the application of the magnitude-affecting agent as a result of predetermined movements of the magnitude-responsive agency and including positioning of the two agencies either as in physical balance in which the position of one agency in its range is directly proportioned to the other agency in its range, or in physical unbalance in which the position of one agency in its range has no relevant proportionality and is disproportionate to the other agency in its range, said system including means for gradually increasing the disproportion between the positions of the two agencies in their ranges in response to predetermined movements of the magnitude-responsive agency, and said system including means responsive to an extreme movement of the magnitude of condition responsive agency to remove the disproportionate positioning and automatically to reestablish the directly proportionate relation of one agency in its range relative to the other agency in its range.

15. The method of regulating the magnitude of condition in a conditioned device which consists in establishing an initial balanced relation between the position of an arm movable with the variation in magnitude of condition and an arm movable with the variation in application of magnitude of condition affecting agent, in causing deviations from a desired magnitude of condition to progressively vary the application of the agent to move its arm to greater and greater disproportionate lengths relative to the magnitude arm, and in removing the accumulated disproportionate adjustments to reestablish the initial balanced relation of the arms as a function of an extreme positioning of an arm.

16. In regulators for controlling the magnitude of a condition, a controlling unit, said unit being arranged for operative association with an assembly including a device subject to condition, a condition responsive electrical control having a movable component variably positioned in response to changes in magnitude of the condition of said device, means for controlling the application of an agent affecting the magnitude of condition of the device, and an application responsive electrical control having a movable component adjustably positioned in response to variations in the application of said agent, said unit comprising a system including a complemental condition responsive electrical control having a movable component arranged to be coupled with such first mentioned electrical control for synchronous movement with the movable component thereof, said system arranged for operative association with both electrical controls of the assembly and being effective to secure a balancing-off of the magnitude of condition of and the application of the agent to said device in a plurality of successive conditions of unrelated disproportionality of position of the respective movable components of the complemental and application-responsive controls as a result of successive departures from and returns to a predetermined magnitude of condition of said device, and means in said system operative when the movable component of the complemental control attains a predetermined position to change the system so that substantially instantaneous balance in the system can maintain without actual balancing-off of the magnitude of condition and the application of the agent and with the movable component of application-responsive control in a predetermined directly proportional position relative to that of the complemental movable element.

17. In regulators for controlling the magnitude of a condition, a device subject to condition, an electrical system including a Wheatstone bridge circuit, a condition-responsive variable resistance element electrically coupled in said Wheatstone bridge circuit to unbalance said circuit in accordance with the variation of its resistance as a function of the existing departure of the magnitude of condition of said device from the desired magnitude, means for controlling the application of an agent affecting the magnitude of condition of said device, a second variable resistance element electrically coupled in said circuit, a third variable resistance means in the circuit for selectively establishing symmetrical or variably unsymmetrical resistances in the bridge circuit between the first and second elements, whereby the adjustments of said second element in said circuit toward balancing the circuit in response to variations of the application of said agent is modified by the setting of said third means in establishing asymmetrical resistances between the first and second means to secure a balancing-off of the existing condition of said device to the demand regardless of the relative proportionality of the respective resistance variations of the first and second variable resistance elements, said system including means arranged whereby upon a predetermined change in the system said third resistance means is actuated to establish symmetrical resistances between the first and second elements whereby balance of the bridge circuit can only occur when the setting of the respective first and second mentioned variable resistances are in balance in direct proportional related settings without modification by the third variable resistance means.

18. A temperature controlling system comprising in combination with a furnace, a temperature-responsive control element operatively associated with the furnace, a temperature in-put controller including a movable device operatively associated with the furnace, a position-responsive control element operatively associated with the said movable device, a control system operatively coupled with the respective control elements and arranged to vary the movable device and the input controller initially as a predetermined function of the variation of temperature within the furnace to establish a predetermined relation between the respective elements, means automatically responsive to furnace load conditions and operatively effective on the control system to modify the initial predetermined functional relation to permit attainment of a different position of the movable device for a given temperature in the furnace, and resetting means operatively associated with the control system for automatically restoring substantially the said initial predetermined relation pursuant to the long continuance of an abnormal furnace temperature.

19. A condition controlling system comprising a condition-responsive control element, movable means for varying the condition of a conditioned unit, a control element operatively coupled to the movable means, control mechanism operatively associated with both of the elements to actuate the movable means in an initial functional relation to variations in condition of such unit, means automatically operative to establish a different functional relation between the movement of the movable means and the variations in condition of such unit to meet a change in the condition demand of such unit, and means automatically operative to reestablish said initial functional relation in response to movement of the movable means to an extreme position.

20. A condition controlling system comprising an electrical bridge circuit, a condition-responsive movable control element on one side of the bridge circuit and operatively associated with a conditioned unit, means movable for controlling the condition of such unit, a movable control element operatively coupled to said movable means on the other side of the bridge circuit, said bridge circuit including operating mechanism to move said means in response to unbalance in the bridge circuit, said coupled movable control element having a symmetrical balanced relationship with the responsive control element in the bridge circuit in one operative relation of the parts, said bridge circuit including means for establishing an asymmetrical balanced relationship between the movable and responsive control elements in another operative relation of the parts, said bridge circuit further including means responsive to long continued deviation of the condition of the unit from the control range of the condition responsive element to temporarily reestablish said symmetrical balance.

21. A temperature-controlling system comprising a temperature-responsive control element, means for varying the temperature of a furnace, a control element operatively coupled to the means, control mechanism operatively associated with both of the elements to actuate the said means in a primary predetermined functional relation to variations in temperature of such furnace, means automatically operative to vary the predetermined functional relation by increments to accord with load variations in such furnace, and automatically operative means to reestablish said primary predetermined functional relation between the movement of the means and the variation in temperatures substantially without increments when desired.

22. In regulators for controlling the magnitude of a condition of a device subject to condition of variable magnitude, a condition-indicating control agency movable in response to the departure of the magnitude of the condition from that which is desired, means for controlling the application to such device of an agent affecting the magnitude of condition thereof, an application-indicating control agency movable in response to variations of the application of said agent, a system cooperably associated with both of said agencies and effective to actuate the agent-applying-control means affecting the condition to permit a balancing-off of the two agencies to disproportionate positions according with balance between the desired magnitude of the condition of such device and the application of the magnitude-affecting-agent to such device regardless of relative proportionality of position of the respective agencies in response to departure of the magnitude of the condition from a desired magnitude, and means responsive to predetermined changes in said system operative when the magnitude of condition is different from that which is desired for automatically disestablishing the balanced-off disproportionate relation and establishing a balanced-off related proportionality of position of the respective agencies.

23. In regulators for controlling the magnitude of a condition of a device subject to condition of variable magnitude, a condition-indicating control agency movable in response to the departure of the magnitude of the condition from that which is desired, means for controlling the application to such device of an agent affecting the magnitude of condition thereof, an application-indicating control agency movable in response to variation of the application of said agent, a system cooperably associated with both of said agencies and responsive to departure of the magnitude of condition of such device from a predetermined magnitude to actuate the condition-magnitude-controlling means toward reestablishment of the predetermined condition of such device and to effect a balancing-off of the two agencies and of the predetermined magnitude against the application of the agent-affecting magnitude in a non-linear relation independent of proportionality of position of the two agencies, and means for securing a predetermined related linear proportionality of position of the two agencies in automatic response to predetermined changes in the system during a departure of condition from said predetermined magnitude.

24. In regulators for controlling the magnitude of a condition of a device subject to condition of variable magnitude, a condition-indicating control agency movable in response to the departure of the magnitude of the condition from that which is desired, means for controlling the application to such device of an agent affecting the magnitude of condition thereof, an application-indicating control agency movable in response to variation of the application of said agent, a system cooperably associated with both of said agencies and effectively responsive to successive departures or a long continued departure of the magnitude of condition from a predetermined magnitude to actuate the condition-magnitude-controlling-means progressively toward greater change of the application of the magnitude-affecting agent toward effecting a balancing-off of the two agencies and of the predetermined magnitude against the application of the agent-affecting magnitude in a relation which is independent of proportionality of position of the two agencies, and means automatically responsive to predetermined changes in the system during a departure of condition from said predetermined magnitude for actuating the condition-magnitude-affecting-control means to a changed applying situation such that the two agencies will be balanced-off in a position of related proportionality of position of the two agencies.

25. In regulators for controlling the magnitude of a condition of a device subject to condition of variable magnitude, a condition-indicating control agency movable in response to the departure of the magnitude of the condition from that which is desired, means for controlling the application to such device of an agent affecting the magnitude of condition thereof, an application-indicating control agency movable in response to variation of the application of said agent, a system cooperably associated with both of said agencies and including a bridge circuit in which the balance of the circuit depends upon the effective positioning of the two agencies relative to each other in the circuit, means in the system for varying the bridge circuit from a condition in which balance of the circuit can obtain with the two agencies in effective symmetrical balanced relative positions, to a condition in which balance of the circuit can obtain with the two agencies in extreme effective asymmetrical unrelated balanced positions, said last means being arranged for effecting an initial symmetrical balanced relation of the circuit and of the two agencies therein, means in the system responsive to departure of the magnitude of condition from the predetermined magnitude to actuate the bridge circuit varying means to effect a variation in the bridge circuit by which balance can be secured only by asymmetrical positioning of the two agencies, means in the system effective on the said departure of the magnitude for actuating the agent applying means for actuating said bridge-circuit varying means for changing the application toward restoration of the predetermined magnitude of condition of such device, and means automatically responsive to a predetermined change in the system for actuating said bridge circuit-varying means for reestablishing during a departure of said magnitude of condition from that which is predetermined a circuit condition in which balance is attained only by the symmetrical positioning of the said two agencies.

26. In regulators for controlling the magnitude of a condition of a device subject to condition of variable magnitude, a condition-indicating control agency movable in response to the departure of the magnitude of the condition from that which is desired, means for controlling the application to such device of an agent affecting the magnitude of condition thereof, an application-indicating control agency movable in response to variation of the application of said agent, a system defining a bridge circuit, the legs of which include complemental-coupled potentiometers, a circuit including a relay in operative relation to the bridge circuit and arranged for actuation in response to and in a direction related to the direction of unbalance of the bridge circuit, a reversible motor for changing the application of the condition-affecting-agent to the device, a reversible motor for driving the potentiometers to change the condition of balance of the bridge circuit, means for actuating the potentiometer motor by timed increments in response to departure of the magnitude of condition from the desired magnitude in said device, said agencies being part of said bridge circuit and capable of asymmetrical positioning therein to establish balance in the bridge circuit when the potentiometers have been actuated to disturb the balance conditions, and means associated with one of said agencies for actuating the potentiometer motor substantially without regard to timed increments when the associated agency has moved to a predetermined position to return the potentiometers to a position in which symmetrical balance of the circuit is permitted, said relay being automatically operative to actuate the reversible motor for the application of the agent until the respective agencies are in symmetrical balanced relation in the established symmetrical circuit.

27. In regulators for controlling the magnitude of a condition, a device subject to condition, a condition-responsive slidewire having an arm effectively relatively movable in response to changes in magnitude of the condition of said device in accordance with the existing departure of the magnitude of the condition of said device from the desired magnitude, means for controlling the application of an agent affecting the magnitude of condition of said device, a slidewire having an arm effectively relatively movable in response to variations of the application of said agent, a system cooperably associated with both slidewires and their movable arms effective to secure a balancing-off of the existing condition and the application of the agent affecting the magnitude of the condition of said device regardless of the existence or non-existence of relative proportionality of the effective relative movement or position of the respective arms relative to their slidewires or of the passage of time in attaining balance, and means in said system arranged so as automatically and relatively rapidly to cause said balanced-off relationship of the respective arms to become unbalanced and to urge and ultimately to cause relative movement of the means for controlling the application of such agent to said device as will cause the arm of the slidewire thereof to effectively relatively move toward a positioning of related proportionality relative to the magnitude-of-condition-responsive slidewire arm.

28. A temperature controlling system comprising a temperature-responsive control element, movable means for varying the temperature of a furnace, a control element operatively coupled to the movable means, control mechanism operatively associated with both of the elements to actuate the movable means in a predetermined linear functional relation to variations in temperature of such furnace, means automatically operative to vary the predetermined functional relation to a non-linear function to accord with load variations in such furnace and time increments of such load variation, and means automatically operating under predetermined control and furnace conditions to temporarily reestablish the predetermined linear functional relation without the delay incident to time increments.

29. A temperature-controlling system comprising a temperature-responsive control element, movable means for varying the temperature of a furnace, a control element operatively coupled to the movable means, control mechanism operatively associated with both of the elements to actuate the movable means in a primary predetermined linear functional relation to variations in temperature of such furnace, means automatically operative to vary the predetermined functional relation to a non-linear function to accord with load variations in such furnace, and means automatically operating under a predetermined change in the relation between control and furnace conditions during an interval when the temperature has departed from that which is desired to reestablish said primary predetermined linear functional relation between the movement of the movable means and the variation in temperature.

30. A condition-controlling system comprising a condition-responsive control element, movable means for varying the condition of a conditioned unit, a control element operatively coupled to the movable means, control mechanism operatively associated with both of the elements to actuate the movable means in an initial functional relation to variations in condition of such unit, means automatically operative to establish relatively slowly a different functional relation between the movement of the movable means and the variations in condition of such unit to meet a change in the condition demand of such unit, and means automatically operative to reestablish relatively rapidly said initial functional relation when the relation of condition-varying to condition of said unit requires.

31. A condition controlling system comprising an electrical bridge circuit, a condition-responsive movable control element on one side of the bridge circuit and operatively associated with a conditioned unit, movable means for varying the condition-affecting agent supplied to such unit, a second movable control element operatively coupled to said movable means on the other side of the bridge circuit, said bridge circuit including operating mechanism to move said means in response to unbalance in the bridge circuit, said coupled movable control element having a symmetrical balanced relationship with the responsive control element in the bridge circuit in one operative relation of the parts, said bridge circuit including means for establishing an asymmetrical balanced relationship between the movable and responsive control elements in another operative relation of the parts, said bridge circuit further including means automatically operating to temporarily reestablish said symmetrical balance when the relation between condition and supply in said unit requires, while the condition-responsive element is off of its control point.

32. The method of regulating temperatures in a furnace which includes the step, after a succession of controlling functions in which the valve and pyrometer control have a stored differential of positioning, of removing the stored differential while the pyrometer control is off of the control point to temporarily establish related identical positioning of pyrometer and valve.

33. In regulators for controlling the magnitude of a condition, a device subject to condition, a magnitude-arm operatively associated with the device and movable through a predetermined range in response to changes in magnitude of the condition of said device relative to a desired magnitude, means for controlling the application of an agent affecting the magnitude of condition of said device, an application-arm operatively associated with the agent-application means and movable through a predetermined path as a function of the application of the condition affecting agent, a system cooperably associated with both arms effective to secure a balancing-off of the existing condition and the application of the agent regardless of the relative proportionality of the movement or position of the respective arms relative to their respective paths, and means in said system arranged so as to cause said balanced-off relationship of the respective arms to become unbalanced and to cause relative actuation of said agent-application means for controlling the application of the condition affecting agent as will cause the application arm to move on its path toward a position of predetermined related proportionality relative to the magnitude arm on its path automatically as a result of predetermined changes in the system while the condition is other than as desired.

34. In regulators for controlling the magnitude of a condition, a device subject to condition, a magnitude-arm operatively associated with the device and movable through a predetermined path in response to changes in magnitude of the condition of said device relative to a desired magnitude, means for controlling the application of an agent affecting the magnitude of condition of said device, an application-arm operatively associated with the agent-application means and movable through a predetermined path as a function of the application of the condition affecting agent, a system cooperably associated with both arms effective to secure a balancing-off of the existing condition and the application of the agent regardless of the relative proportionality of the movement or position of the respective arms relative to their respective paths, and means in said system arranged so as to cause said balanced-off relationship of the respective arms to become unbalanced and to cause relative actuation of said agent-application means for controlling the application of the condition affecting agent as will cause the application arm to move on its path toward a position of predetermined related proportionality relative to the magnitude arm on its path automatically as a result of predetermined changes in the system, said predetermined changes occurring when an arm reaches a predetermined point out of mid-position on its path of movement.

35. In regulators for controlling the magnitude of a condition, a device subject to condition, an electrical control operable in response to changes in magnitude of condition of said device from a control point representing the desired magnitude to manifest a value of said magnitude within a predetermined restricted range of values including the control point, means for controlling the application of an agent affecting the magnitude of condition of said device, a second electrical control-operable in response to variations of the application of said agent to manifest a value of said application within its complete range of values, said predetermined restricted range of values having a predetermined proportional relation to said complete range of values, a system cooperably associated with both controls effective to secure a balancing-off of the existing condition and the application of the agent affecting the magnitude of the condition of said device regardless of the relation of the manifestation of the instant value of the application control on its range to that of the other on its range, and means automatically responsive to predetermined changes in the system while the magnitude-of-condition control is off of said control point for actuating the condition-magnitude-affecting control means to a changed application of the agent such that the two controls will be balanced-off in a position of predetermined proportional relation of manifestation of the instant values of the two controls on their respective ranges.

36. In regulators for controlling the magnitude of a condition, a device subject to condition, an electrical control operable in response to changes in magnitude of condition of said device from a control point representing the desired magnitude to manifest a value of said magnitude within a predetermined restricted range of values including the control point, means for controlling the application of an agent affecting the magnitude of condition of said device, a second electrical control operable in response to variation of the application of said agent to manifest a value of said application within its complete range of values, said predetermined restricted range of values having a predetermined proportional relation to said complete range of values, a system cooperably associated with both controls effective to secure a balancing-off of the existing condition and the application of the agent affecting the magnitude of the condition of said device regardless of the relation of the manifestation of the instant value of the application control on its range to that of the other on its range, and means automatically responsive to predetermined changes in the system for actuating the condition-magnitude-affecting control means to a changed application of the agent such that the two controls will be balanced-off in a position of predetermined proportional relation of manifestation of the instant values of the two controls on their respective ranges, said predetermined change comprising the attainment of a manifestation of values of one control at the limit of its said range.

37. The method of regulating the magnitude of condition in a conditioned device which consists in establishing an initial balanced relation between the position of an arm movable with the variation in magnitude-of-condition and an arm movable with the variation in application of magnitude-of-condition-affecting agent, in causing deviations from a desired magnitude of condition to progressively vary the application of the agent to move the arm to greater disproportionate adjustments relative to the magnitude arm, and in directly and non-progressively removing the accumulated disproportionate adjustments to reestablish the initial balanced relation of the arms when the relation of condition of the device to the application of magnitude-of-condition-affecting agent requires.

WALTER LESLIE HUNT.